United States Patent [19]

Masuda et al.

[11] 4,202,258
[45] May 13, 1980

[54] COOKING APPARATUS

[75] Inventors: Teruo Masuda, Tokyo; Masayasu Morita, Fuchu, both of Japan

[73] Assignee: France Bed Co., Ltd., Tokyo, Japan

[21] Appl. No.: 963,355

[22] Filed: Nov. 24, 1978

[51] Int. Cl.² .............................................. A23L 3/00
[52] U.S. Cl. ...................................... 99/348; 219/489
[58] Field of Search ............ 99/280, 281, 325–329 R, 99/348, 468, 470, 486; 126/20, 39 G; 219/392–394, 401, 412–414, 489, 507, 510

[56] References Cited

U.S. PATENT DOCUMENTS

| 3,838,248 | 9/1974 | Uchida et al. | 219/210 |
| 3,979,056 | 9/1976 | Barnes | 219/489 X |
| 4,054,778 | 10/1977 | Wollich | 219/413 |

Primary Examiner—Leonard D. Christian

Attorney, Agent, or Firm—Frishauf, Holtz, Goodman & Woodward

[57] ABSTRACT

A cooking apparatus includes a fermenting heater for a vessel which is disposed below the bottom of the vessel and a fermenting heater for an oven chamber which, together with the fermenting heater for the vessel, can be turned ON. A kneading switch, fermenting/baking switch and a release switch for opening these switches are disposed on the front surface of the apparatus housing. Likewise, an exclusive time setter, automatic time setter and baking time setter are disposed on the front surface of the apparatus housing. A kneading circuit, fermenting/baking circuit, kneading/fermenting circuit and fermenting/baking circuit are selectively controlled by selecting a combination of the switches and time setters to perform a kneading step, fermenting step and baking step either singly or in combination.

4 Claims, 10 Drawing Figures

COOKING APPARATUS

BACKGROUND OF THE INVENTION

This invention relates to cooking apparatus, and in particular to cooking apparatus capable of effecting a kneading step, fermenting step and baking step either separately or in a continuous manner.

Recently, the hand-making of a food such as a mochi (Japanese rice cake), noodle, bread etc. is in vogue among general households. However, a known cooking apparatus can normally perform only one or two of a kneading step, fermenting step and baking step. For example, an electric mochi making apparatus can perform only a kneading step and an electric oven can perform one or both of a fermenting step and baking step. For example, a bread making apparatus includes all the three steps. A bread is made by kneading dough while adding yeast fungi, warming it to a fermenting temperature of about 38° C. for about 50 minutes, and baking the fermented dough at a baking temperature of about 250° C. in an oven. In a food such as a bread, requiring all three steps, an electric mochi making apparatus for kneading and an oven for fermentation and baking are necessary and all the three steps can not be performed continuously in a single apparatus. There is a growing demand for a cooking apparatus which can perform all three steps. Japanese Utility Model Publication 7352/76 discloses such apparatus. The prior apparatus is a bread making apparatus and comprises a kneading vessel for kneading dough by a kneading blade, a fermenting chamber disposed above the vessel to warm the dough for fermentation, and a baking oven disposed above the fermenting chamber to bake the fermented dough. It is needless to say that a mochi can be made utilizing only the kneading vessel and a glatin be baked utilizing the baking oven alone. However, such conventional apparatus becomes bulky, since the respective steps are effected in the respective sections of the apparatus.

SUMMARY OF THE INVENTION

It is accordingly the object of this invention to provide a small-sized cooking apparatus which can perform all the steps of kneading, fermenting and baking in a continuous way.

The above and further objects and novel features of the invention will be more fully apparent from the following detailed description when the same is read in connection with the accompanying drawing. It is to be expressly understood, however, that the drawing is for purpose of illustration only and is not intended as a definition of the limits of the invention.

DETAILED DESCRIPTION

Referring to FIGS. 1 to 4, a cooking apparatus 10 of this invention includes a substantially box-like housing 12. The housing 12 is divided by partition means 14 into upper and lower chambers 18 and 20, the partition means 14 having a partition plate 16 made of a heat insulating material. An oven housing 26 is disposed in the lower chamber 20 having an oven chamber 24 defined therein, and the oven chamber 24 has an openable, hinged door 22 at one side. The door 22 of the oven housing 26 confronts a mounting recess 28 formed at the front side of the oven housing 12. The oven housing 26 has its bottom surface fixed by a plurality of mounting legs 30 to the box-like housing 12 of the apparatus. A latching frame 32 bent in a crank-like fashion is fixed to the marginal edge of the oven housing 26. The latching frame 32 is latched, through a heat insulating packing 36, to a flange 34 formed on the marginal edge of the mounting recess 28 of the housing 12. A pair of baking heaters 38 such as electric heaters are attached by a latching means and retainers 40 to the upper and lower inner surfaces of the oven housing 26. A retaining member 44 is mounted on the opposite side surfaces to support shelf plates (not shown). A fermenting heater 46 is disposed on the lower surface of the oven chamber to permit the interior of the oven chamber to be preheated to a fermenting temperature.

Figure 3:
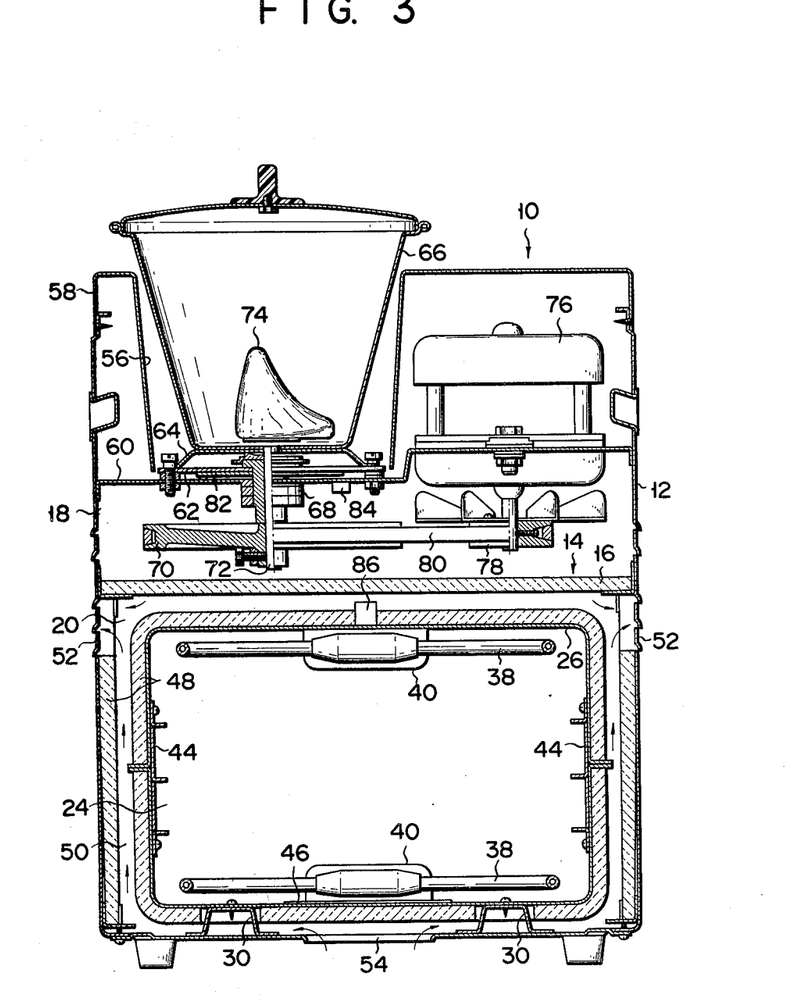
FIG. 3 is a longitudinal sectional view taken along line III—III in FIG. 2.

A heat insulating material 48 is attached to the outer surface of the oven housing 26 and the inner surface of the lower chamber 29, and an air passage 50 is defined between the outer surface of the oven housing 26 and the inner surface of the lower chamber 20. A louver 52 is formed at the opposite side surfaces of the lower chamber 20 and a suction inlet 54 is formed in the lower wall of the lower chamber 20. When the interior of the oven chamber 24 is heated by the baking heater 38 to permit heat to be radiated from the surface of the oven housing 26, a natural convection of air is developed in the air passage 50 and hot air flows from the suction inlet 54 toward the louver 52 as indicated in FIG. 3, and is discharged out of the housing 12.

Since the oven housing 26 is fixed through the heat insulating packing 36 to the front surface of the box-like housing 12, the front surface of the housing 12 is prevented from being heated to a high temperature.

Figure 4:
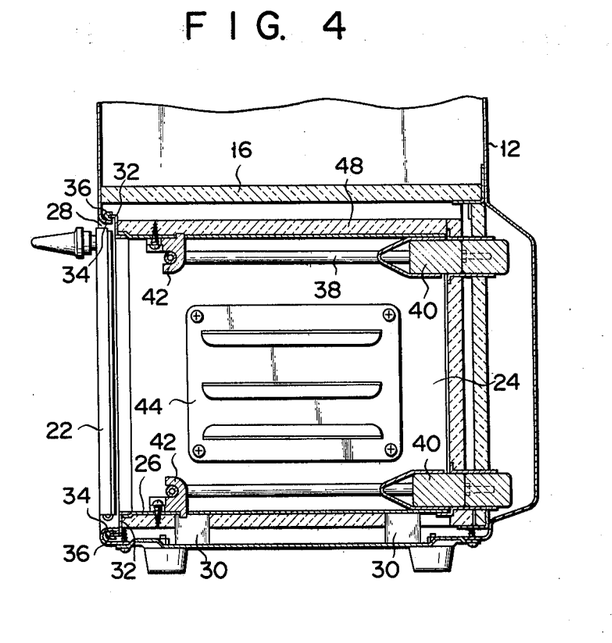
FIG. 4 is a longitudinal sectional view taken along line IV—IV of FIG. 1.
Figure 5:
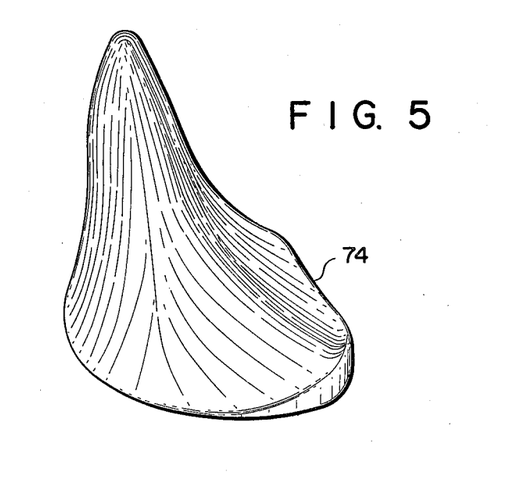
FIGS. 5 to 9 are a perspective view, front view, plan view, bottom view and right side view, respectively, showing a kneading blade incorporated in the cooking apparatus.
Figure 6:
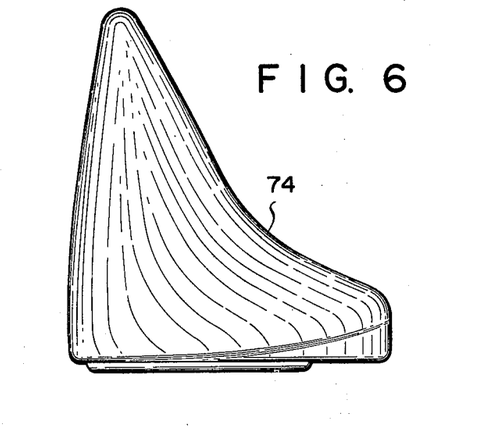
Figure 7:
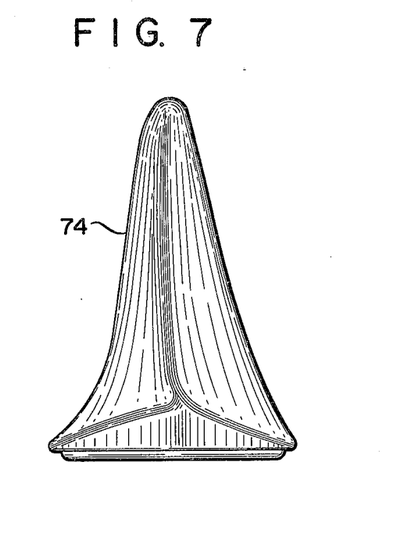
Figure 8:
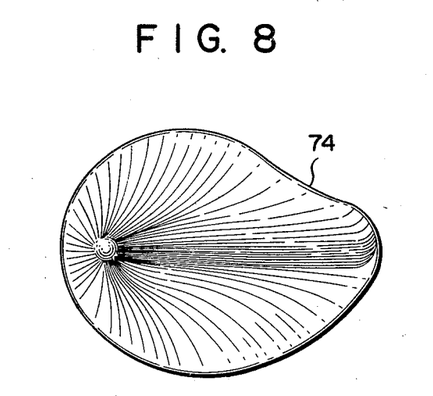
Figure 9:
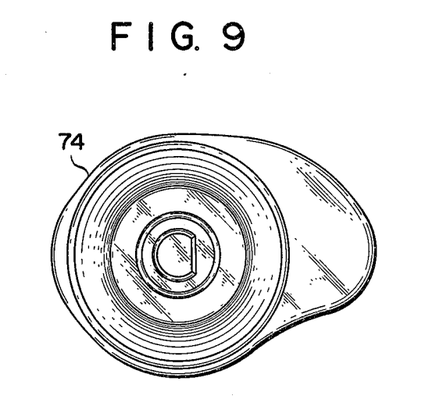

A cover 58 is disposed above the upper chamber 18 of the housing 12 and has a recess 56. A mounting plate 60 is mounted in the upper chamber 18. A bottom plate 62 is attached in the upper chamber 18 to provide a bottom of the recess 56. A contact plate 64 having a substantially inverted plate-like configuration is fixed to the bottom plate 62. A vessel 66 having its inner surface coated with Teflon is detachably mounted in the recess 56 such that the bottom surface of the vessel 66 is in contact with the contact plate 64.

A bearing 68 is fixed in the bottom plate 62 and a shaft 72 is rotatably journaled in the bearing 68 such that one end thereof extends into the vessel 66. A pulley 70 is fitted over the other end portion of the shaft 72. A kneading blade 74 to be later described is detachably mounted on that end of the shaft 72 which extends into the vessel. A motor 76 is attached to the mounting plate 60 through a buffer member (not shown). An endless belt 80 is entrained between the pulley 70 and a pulley 78 on the motor shaft to permit the blade 74 to be rotated. A fermenting heater 82 is mounted on the bottom plate 62 to heat the interior of the vessel through the bottom plate 62 and contact plate 64.

The heaters 82 and 42 are controlled by a first thermoswitch 84 attached to that rear surface portion of the mounting plate 60 where the bottom of the vessel is placed. By so doing, the interior of the vessel 66 and oven chamber 24 can be warmed to a fermenting temperature of about 38° C. The baking heater 38 is controlled by a second thermoswitch 86 fixed in contact with the outer surface of the oven chamber 24, and permits heating of the oven chamber 24 to about 250° C.

Figure 1:
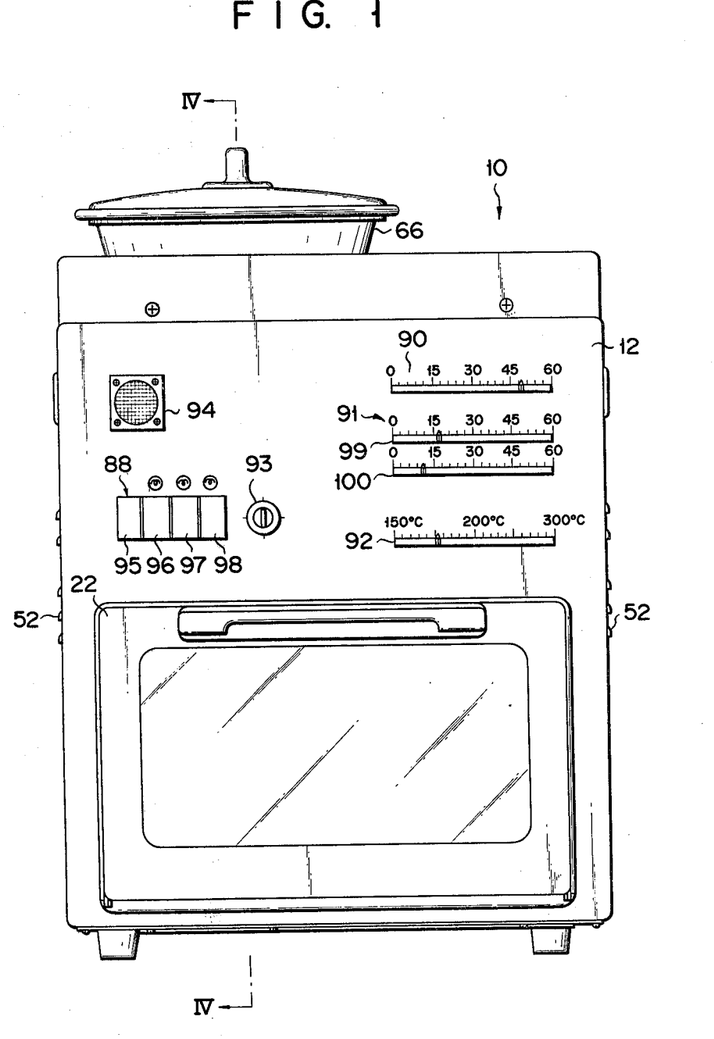
FIG. 1 is a front view showing a cooking apparatus according to one preferred embodiment of this invention.
Figure 2:
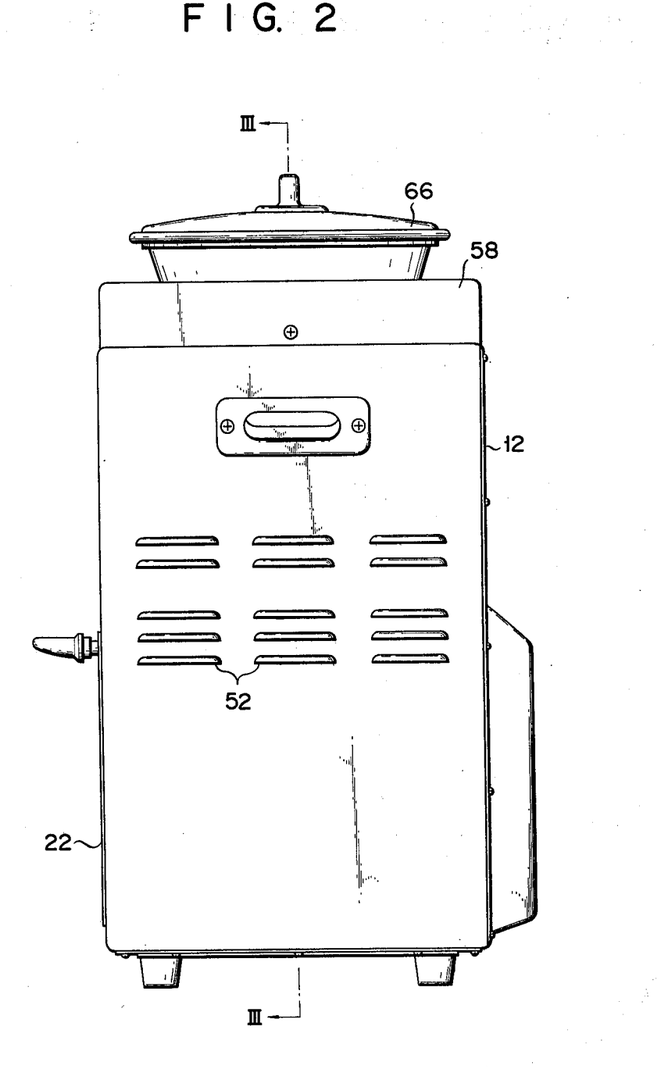
FIG. 2 is a right side view showing the cooking apparatus of FIG. 1.

On the front surface of the housing 12 are provided an operation switch section 88, exclusive time setter 90, automatic time setter 91, oven temperature setter 92, baking heater selection button 93 and buzzer 94. The operation switch 88 comprises an OFF-switch 95, kneading switch 96, fermenting switch 97 and baking switch 98. By operating a switch of the operation switch section 88 the corresponding part or section of the apparatus is operated over a time period set by the exclusive time setter 90. The automatic time setter 91 includes a kneading/fermenting scale 99 and fermenting/baking scale 100. When an indicator on the kneading/fermenting scale of the automatic time setter 91 is set to a predetermined time and the kneading switch 96 and fermenting switch 97 are simultaneously operated, the kneading blade 74 in the vessel 66 is rotated and then the fermenting heaters 46 and 82 are turned ON, causing the interior of the vessel 66 and oven chamber 24 to be maintained at a temperature which is set by the first thermoswitch 84. In this way, kneading and fermenting can be effected according to the above-mentioned set time. If in this case the kneading blade 74 is further driven for several minutes, the fermented dough in the vessel 66 can be degassed. Since the oven chamber 24 is preheated by the fermenting heater 46 for the oven chamber 24, yeast fungi are prevented from being killed due to the dough being cooked which would occur if the dough is placed in the oven chamber before the oven chamber is preheated by the baking heater 38.

The baking switch 98 is operated with an indicator on the oven chamber temperature setting scale 92 set to a predetermined temperature and an indicator on the fermenting/baking scale 100 of the automatic time setter 91 set to a predetermined time. The oven chamber 24 is controlled by the second thermoswitch 86 to the set temperature. In this way, the oven chamber 24 is heated by the baking heater 38 to permit the dough to be baked.

Upon completion of the operations set by the exclusive time setter 91 the buzzer 94 produces an alarm sound. The oven chamber 24 is heated by the baking heater 38 to about 250° C. For this reason, the temperature of the fermenting heater 46 in the oven chamber is influenced by heat from the baking heater 38 and can not be directly controlled by the first thermoswitch 84. The fermenting heater 82 is connected in parallel with the fermenting heater 46 and the thermoswitch 84 adapted to sense heat from the heater 82 is mounted on the mounting plate 60 and is thus not influenced by the heat in the oven chamber 24. For this reason, the heater for the oven is not influenced by the heat in the oven chamber 24 and has its temperature indirectly controlled by the thermoswitch 84. In consequence, the first-thermoswitch 84 having a narrower temperature control range is prevented from being damaged by heat.

Recently, there has been a tendency that in a bread making plant the dough is kneaded in immediate readiness for baking and then completely frozen for delivery to local distributors. In this case, such frozen dough is bought from local retailers or distributors and it is baked in the general household utilizing the cooking apparatus according to this invention. It is only necessary that such dough be fermented and baked in a continuous fashion. According to this invention, such dough is placed in the oven chamber and the fermenting and baking switches 97 and 98 are simultaneouly operated with the indicator on the fermenting/baking scale 100 in the automatic time setter 91 set to a predetermined time. By the fermenting heater 46 the dough in the oven chamber 24 is warmed for fermentation and the interior of the oven chamber is controlled by the thermoswitch 86 to a temperature set by the oven temperature setter 92, and the dough in the oven chamber is heated by the baking heater. In this way, a bread is obtained.

The shape of the kneading blade 74 imparts a great influence to the dough to be kneaded. Experiments have been made using various molded blades and a blade shape as shown in FIGS. 5 to 9 is found most suitable for agitation and kneading. The kneading blade is rotated in the clockwise direction (see the plan view in FIG. 8).

Figure 10:
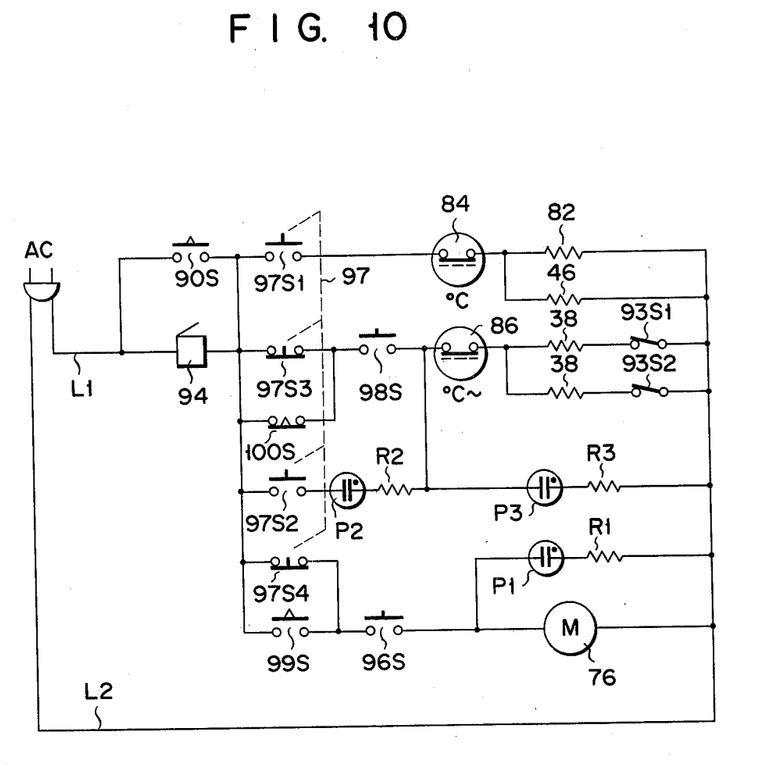
FIG. 10 is a control circuit incorporated in the cooking apparatus.

FIG. 10 shows a control circuit through which the above-mentioned operation is controlled. In FIG. 10, L1 and L2 are power source lines through which current from a commercial AC power source is supplied; 90S, a normally open timer contact of the exclusive time setter 90; 99S, a normally open timer contact of the kneading/fermenting setter of the automatic time setter; 100S, a normally closed timer contact of the fermenting/baking setter 100 of the automatic time setter 91; 96S, a normally open contact of the kneading switch 96; 97S1 and 97S2, normally open contacts of the fermenting switch 97; 97S3 and 97S4, normally closed contact switch of the fermenting switch 97; 98S, a normally open contact of the baking switch 98; 93S1, 93S2, heater changeover switch selectively operated by a baking heater selection button 93; P1, a neon lamp for kneading operation display; P2, a neon lamp for fermenting operation display; P3, a neon lamp for baking operation display; and R1, R2 and R3, resistors for neon lamp lighting control. 38 denotes a baking heater as shown in FIGS. 1 to 4; 46, 82 respective, fermenting heaters for the oven chamber and vessel; 76, a motor; 84, a first thermoswitch; 86, a second thermoswitch variably controlled by the oven temperature setter 92; and 94, a buzzer.

The operation of the cooking apparatus will now be explained belows.

When the kneading switch 96 is operated with a pointer on the exclusive time setter 90 set to a time (for example, 8 minutes), it is mechanically locked to cause the normally open contact 96S to be closed. After lapse of the set time (8 minutes) the normally open timer contact 90S is closed. A first current path is created which is traced from the power supply line L1 to the line L2 through the normally open timer contact 90S in the exclusive time setter, the normally closed contact 97S4 in the fermenting switch, the normally open contact 96S of the kneading switch, and a parallel circuit consisting of the neon lamp P1 and resistor R1 and the motor 76. The motor 76 is rotated to cause the kneading blade to be rotated to permit dough in the vessel 66 to be kneaded. Since electric power is supplied to the motor 76, the neon lamp P1 for kneading operation indication is lighted. When the setting time (8 minutes) of the exclusive time setter 90 passes, the normally open timer contact 90S is returned to the open state, causing the power supply to the motor 76 and neon lamp P1 to be interrupted. The alternating current of the power supply is then supplied to sound a buzzer 94. A release button 95 is operated based on the alarm operation of the buzzer 94, causing the kneading switch 96 to be opened. As a result, the normally open contact 97S is brought back to the open state to interrupt the power supply to the buzzer 94. In this way, the cooking apparatus is returned to the initial state.

When the kneading and fermenting operations are effected, the automatic time setter 99 is set to a kneading time (for example, 5 minutes), while the exclusive time setter 90 is set to a time (for example, 55 minutes) corresponding to the sum of the fermenting time (for example, 50 minutes) and kneading time (5 minutes). The kneading switch 96 and fermenting switch 97 are both operated, establishing a second current path leading from the line L1 to the line L2 through the normally open timer contact 90s in the exclusive time setter, normally open timer contact 99S in the kneading/fermenting setter, the normally open contact 96S in the kneading switch and the parallel circuit consisting of the neon lamp P1 and resistor R1 and the motor 30, and a third current path leading from the line L1 to the line L2 through the normally open timer contact 90S in the exclusive time setter, thermoswitch 84 and a parallel circuit consisting of the fermenting heater 82 for the vessel and the fermenting heater 46 for the oven chamber. As a result, the motor 76 is driven over the set time (5 minutes) to permit dough to be kneaded, and the fermenting heaters 46 and 82 release heat under the temperature control of the first thermoswitch 84 within the time range set by the exclusive time setter to keep the interior of the vessel to the fermenting temperature while preheating the oven chamber. At this time, a current path is established which is traced from the line L1 to the line L2 through the normally open timer contact 90S in the exclusive time setter, normally open contact 97S2 in the fermenting switch, neon lamp P2, resistor R2, thermoswitch 86 and a parallel circuit consisting of the baking heater 38 and heater changeover switch 93S1 and the baking heater 38 and heater changeover switch 93S2. The neon lamp P2 for fermention display is thus lighted. When the setting time of the automatic time setter 99S passes, the normally open timer contact 100S is opened, canceling the second current loop. The current supply to the neon lamp P1 for kneading display is interrupted, terminating the kneading operation. Thereafter, only the fermenting operation continues through the third current path and the oven chamber 24 is kept at the fermenting temperature under control of the thermoswitch 84. When the setting time of the exclusive time setter 90 is reached 50 minutes after the kneading operation has been completed, the normally open timer contact 90S is opened, interrupting the third current path. As a result, the fermenting heaters 46 and 82 are turned OFF and the buzzer 94 produces an alarm sound. If at this time the release button 95 is operated, the kneading switch 96 and fermenting switch 97 are released, interrupting the current supply to the buzzer 94. As a result, the kneading and fermenting operations are completed.

When only the fermenting operation is effected, the fermenting switch 97 is operated with the exclusive time setter 90 set to the fermenting time (for example, 30 minutes), thus establishing the above mentioned third current path leading from the line L1 to the line L2. At the same time, the neon lamp P2 for fermentation display is also lit as shown above. As a result, a fermenting operation is effected over the time period set by the exclusive time setter 90. After lapse of the setting time (30 minutes) the normally open timer contact 90S is brought to the open state and the fermenting heater 46 and 82 are turned OFF. A buzzer 94 produces an alarm sound. If at this time the release button 95 is operated, the fermenting switch 97 is turned OFF, bringing the cooking apparatus to the initial state.

When dough, after first fermenting, is subjected to a sound fermentation and baking, the temperature setter 92 is set to the baking temperature (for example, 220° C.) and the automatic time setter 100S is set to the baking time (for example, 30 minutes). That is, the fermenting switch 97 and baking switch 98 are both operated with the exclusive time setter 90S set to a time (50 minutes) corresponding to a sum of the fermenting time (for example, 20 minutes) and baking time (30 minutes). This establishes the third current circuit path leading from the line L1 to the line L2, and at the same time a current path for the operation of the ferment mode display neon lamp P2. Since during the kneading/first fermentation period the oven chamber 24 is preheated by the first fermenting heater 46 and thermoswitch 84 to the fermenting temperature, the dough is favorably fermented. When the fermenting time period (20 minutes) passes, the normally closed timer contact 100S is brought back to the open state, creating the fourth current path leading from the line L1 to the line L2 through the normally open timer contact 90S in the exclusive time setter, normally closed timer contact 100S in the fermenting/baking setter, normally open contact 98S in the baking switch, second thermoswitch 86 and a parallel circuit consisting of the baking heater 38 and heater changeover switch 93S1 and baking heater 38 and heater changeover switch 93S2, and an operation current path for the bake mode display neon lamp P3. The heater 38 is turned ON under the control of the second thermoswitch 86 to keep the oven chamber at the set temperature and a P2-R2 current path is shorted by the normally closed timer contact 100S in the fermenting/baking setter and normally open contact 98S in the baking switch 98S, thereby lighting the neon lamp P3. At this time, the third current path remains ON and thus the fermenting heaters 46 and 82 remain ON.

When the setting time (50 minutes) of the exclusive time setter 90 is reached after lapse of the set time period corresponding to the fermenting time (20 minutes) and heating time (30 minutes), the normally open timer contact 90S is returned to the open state, thereby interrupting the current supply to the fermenting heaters 46 and 82 and baking heater 38. At this time, the buzzer 94 produces an alrm sound. When the release button 95 is operated, the fermenting switch 97 and baking switch 98 are turned OFF, a power supply to the buzzer 94 is interrupted and the cooking apparatus is brought back to the initial state.

When only the baking operation is effected, the baking switch 98 is operated with the exclusive time setter 90 set to the baking time (for example, 15 minutes) and the oven temperature setter 92 set to the heating temperature (for example, 200° C.). The selection of the heaters 38, can be effected by setting the baking heater selection button 93. This establishes the fifth current path leading from the line L1 to the line L2 through the normally open timer 90S in the exclusive time setter, normally closed contact 97S3 in the fermenting switch, normally open contact 98S in the baking switch, thermoswitch 86 and a parallel circuit consisting of the baking heater 38 and heater selection switch 93S1 and the baking heater 38 and heater selection switch 93S2, and a current path for the bake mode diplay neon lamp P3 which path is traced from the line L1 to the line L2 through the normally open timer contact 90S in the exclusive time setter, normally closed contact 97S3 in the fermenting switch, normally open contact 98S in the baking switch, neon lamp P3 and register R3. The baking operation is effected over the time period (15 minutes) set by the exclusive time setter 90 and the neon lamp P3 is lighted. After lapse of the setting time (15 minutes) the normally open timer contact 90S is brought back to the open state, interrupting the current supply to the heater 38. The buzzer 94 produces an alarm sound. When the release button 95 is operated, the baking switch 98 is opened, bringing the cooking apparatus back to the initial state.

According to this invention the apparatus housing is separated by a partition plate into upper and lower chambers and an oven chamber is defined in the lower chamber of the housing, the oven chamber having a baking heater therein. A vessel, having a kneading blade therein, is disposed on the upper chamber and a drive mechanism is diaposed within the upper chamber and adapted to rotate the blade. A fermenting heater is disposed below the bottom of the vessel to heat the interior of the vessel to the fermenting temperature. In consequence, dough is kneaded and fermented in the vessel and baked in the oven chamber. A fermenting heater for the vessel and fermenting heater for the oven are simultaneously turned ON to heat the interior of the vessel and oven chamber to the same fermenting temperature, preventing yeast fungi from being killed during the tranfer of dough from the vessel to the oven chamber. Since the temperature of the fermenting heater for the oven is controlled by a thermoswitch adapted to sense heat from the fermenting heater for the vessel, the temperature control can be effected reliably.

A kneading switch, fermenting switch, baking switch and release switches for opening these switches are provided on the front surface of the apparatus housing. Likewise, an exclusive time setter, automatic time setter and baking time setter each having its own time limiting contact are provided on the front surface of the apparatus housing. A fermenting control circuit, baking control circuit and fermenting/baking control circuit are selectively controlled by selectively operating the above-mentioned switches and time setters and, by so doing, the kneading/fermenting operation and baking operation can be performed either singly or in a continuous manner.

Although in the above-mentioned embodiment all the steps of making bread have been explained, this invention is not restricted thereto and one step or any suitable combination of steps can be effected as required.

What we claim is:

1. A cooking apparatus comprising:
an apparatus housing, the apparatus housing having a kneading switch, fermenting switch and baking switch thereon;
partition means for separating the apparatus housing into upper and lower chambers;
an oven chamber defined in the lower chamber and having a baking heater therein;
a vessel having a shaft extending through the bottom of the vessel and a kneading blade fixed to the upper end of the shaft interior of the vessel;
fermenting means including a first fermenting heater for the vessel which is disposed below the bottom of the vessel to heat the interior of the vessel to a fermenting temperature, and a second fermenting heater for the oven which is disposed in the oven chamber and which, together with the first fermenting heater for the vessel, is turned ON to preheat the oven chamber;
a thermoswitch coupled to said second fermenting heater for the oven and adapted to sense heat from the second fermenting heater for the oven to effect a temperature control of the second fermenting heater for the oven;
a release switch disposed on the apparatus and housing and coupled to open the kneading switch, fermenting switch and baking switch;
an exclusive time setter, automatic time setter and baking temperature setter each having its own time limiting contact; and
a fermenting control circuit coupled at least to said exclusive time setter and being responsive to operation of said exclusive time setter and kneading switch to turn both of the fermenting heaters ON to cause the interior of the vessel and oven chamber to be heated to a temperature set by the thermoswitch over a time period set by the exclusive time setter.

2. A cooking apparatus according to claim 1, further including:
a drive mechanism coupled to said shaft; and
an agitating/kneading control circuit responsive to setting of said exclusive time setter and automatic time setter to turn both of the fermenting heaters ON to cause the interior of the vessel and oven chamber to be heated to a temperature set by the thermoswitch, while at the same time causing said drive mechanism to be rotated over a time period set by the automatic time setter.

3. A cooking apparatus according to claim 2,
wherein said agitating/kneading control circuit further includes means responsive to operation of said exclusive time setter and kneading switch to cause said drive mechanism to be rotated over a time period set by the exclusive time setter;
and further comprising:
a baking heater for heating said oven chamber to a baking temperature; and
a baking control circuit responsive to operation of said baking switch with the exclusive time setter and baking temperature setter both in the set state, to cause said baking heater to be turned ON to heat the oven chamber to a temperature set by the baking temperature setter over a time period set by the exclusive time setter.

4. A cooking apparatus according to claim 3, further including a fermenting/baking control circuit responsive to operation of said fermenting switch and baking switch with the exclusive time setter, automatic time setter and baking time setter all in the set state, to turn the second fermenting heater for the oven ON to heat the oven chamber to a temperature set by said thermoswitch and then to turn the baking heater ON to heat the oven chamber to a temperature set by the baking temperature setter over a time period set by the automatic time setter.

* * * * *